United States Patent
Fert et al.

(10) Patent No.: US 12,173,657 B2
(45) Date of Patent: Dec. 24, 2024

(54) AIRCRAFT TURBOMACHINE COMPRISING MEANS FOR PRIMING THE LUBRICATING PUMP

(71) Applicant: SAFRAN AIRCRAFT ENGINES, Paris (FR)

(72) Inventors: Jérémy Edmond Fert, Moissy-cramayel (FR); Nicolas Vincent Pierre-Yves Cotereau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/597,047

(22) PCT Filed: Jun. 19, 2020

(86) PCT No.: PCT/FR2020/051070
§ 371 (c)(1),
(2) Date: Dec. 23, 2021

(87) PCT Pub. No.: WO2020/260808
PCT Pub. Date: Dec. 30, 2020

(65) Prior Publication Data
US 2022/0235708 A1    Jul. 28, 2022

(30) Foreign Application Priority Data

Jun. 25, 2019 (FR) ...................................... 1906906

(51) Int. Cl.
*F01D 25/18* (2006.01)
*F01D 19/00* (2006.01)
(Continued)

(52) U.S. Cl.
CPC .............. *F02C 7/277* (2013.01); *F01D 19/00* (2013.01); *F01D 25/18* (2013.01); *F02C 7/06* (2013.01); *F05D 2260/98* (2013.01)

(58) Field of Classification Search
CPC ........... F01D 25/18; F01D 25/20; F02C 7/277
See application file for complete search history.

(56) References Cited

U.S. PATENT DOCUMENTS 3,078,667 A * 2/1963 Deinhardt ................. F02C 7/22
184/6
3,878,677 A * 4/1975 Colvin ..................... F02C 6/08
415/910

(Continued)

FOREIGN PATENT DOCUMENTS

GB          1053264 A    12/1966
WO    2013180939 A1    12/2013

OTHER PUBLICATIONS

Soares, Claire, Gas Turbines, A Handbook of Air, Land and Sea Applications, 2008, Elsevier Academic Press, pp. 41, 172-177 and 300-302. (Year: 2008).*

(Continued)

*Primary Examiner* — Todd E Manahan
*Assistant Examiner* — Marc Amar
(74) *Attorney, Agent, or Firm* — Pearne & Gordon LLP

(57) ABSTRACT

An aircraft turbomachine includes a lubricating circuit notably including a reservoir of lubricating fluid, a pump drawing lubricating fluid from the reservoir to inject it toward several components of the turbomachine, and an intake pipe connecting the reservoir to an intake orifice of the pump, the turbomachine further including a pneumatic starting circuit including a starting tube through which there circulates a flow of compressed air intended to supply a pneumatic starter of the turbomachine, wherein it includes a pneumatic line extending from the starting tube as far as the reservoir (Continued)

so as to supply the reservoir with compressed air so as to cause the lubricating fluid to circulate through the intake pipe towards the pump.

9 Claims, 2 Drawing Sheets

(51) Int. Cl.
   *F02C 7/06* (2006.01)
   *F02C 7/277* (2006.01)

(56) References Cited

U.S. PATENT DOCUMENTS

| | | | | |
|---|---|---|---|---|
| 6,000,214 | A * | 12/1999 | Scragg | F02C 5/02 60/39.38 |
| 2009/0313999 | A1 * | 12/2009 | Hunter | F02C 7/18 60/730 |
| 2010/0213010 | A1 * | 8/2010 | Cornet | F01D 25/20 184/6.11 |
| 2012/0111022 | A1 * | 5/2012 | Dyer | F02C 7/32 60/788 |
| 2013/0177410 | A1 * | 7/2013 | Eleftheriou | F01D 25/24 415/208.1 |
| 2013/0291514 | A1 * | 11/2013 | Suciu | F02C 7/12 60/39.08 |
| 2014/0373505 | A1 * | 12/2014 | Dyrla | B64C 27/006 60/39.15 |
| 2016/0273393 | A1 * | 9/2016 | Ekanayake | F02C 6/08 |
| 2017/0051667 | A1 * | 2/2017 | Godman | F02C 3/04 |
| 2018/0128121 | A1 * | 5/2018 | Avis | F01D 9/065 |
| 2020/0109665 | A1 * | 4/2020 | Logan | F01D 25/20 |
| 2021/0163147 | A1 * | 6/2021 | Fayolle | F01D 25/14 |

OTHER PUBLICATIONS

Soares, Claire, Gas Turbines, A Handbook of Air, Land and Sea Applications, 2008, Elsevier Academic Press, pp. 294-295. (Year: 2008).*

Search Report issued in French Patent Application No. 1906906 dated Feb. 28, 2020.

International Search Report for issued in Application No. PCT/FR2020/051070 dated Nov. 13, 2020.

Written Opinion for PCT/FR2020/051070 dated Nov. 13, 2020.

* cited by examiner

AIRCRAFT TURBOMACHINE COMPRISING MEANS FOR PRIMING THE LUBRICATING PUMP

This is the National Stage of PCT international application PCT/FR2020/051070, filed on Jun. 19, 2020 entitled "AIRCRAFT TURBOMACHINE COMPRISING MEANS FOR PRIMING THE LUBRICATING PUMP", which claims the priority of French Patent Application No. 1906906 filed Jun. 25, 2019, both of which are incorporated herein by reference in their entirety.

TECHNICAL FIELD

The invention relates to an aircraft turbomachine including a lubricating circuit and means for priming the pump.

More particularly, the invention relates to an aircraft turbomachine including a pneumatic pipe for priming the pump upon start-up of the turbomachine.

PRIOR ART

In particular, an aircraft turbomachine includes a lubricating circuit allowing supplying different components of the turbomachine with lubricating liquid.

In particular, this lubricating circuit includes a tank in which the lubricating liquid is stored and a pump drawing the lubricating liquid to send it towards the components to be lubricated.

In general, the tank is disposed in the FAN compartment, i.e. a compartment surrounding the fan of the turbomachine.

In turn, the pump is disposed proximate to an accessory drive box, in a central compartment of the turbomachine, commonly called "core" compartment.

To connect the pump to the tank, the lubricating circuit includes a suction pipe which is connected to the tank and to a suction orifice of the pump.

This suction pipe extends in the turbomachine while crossing a structural arm, whose main function is to support the central compartment of the turbomachine.

An aircraft turbomachine may essentially include two structural arms disposed at 6 O'clock and at 12 O'clock, i.e. vertically with respect to Terrestrial gravity below and above the central compartment, respectively.

According to a known embodiment, the suction pipe crosses a support arm located at 6 O'clock, i.e. which is located vertically below the central compartment.

When the turbomachine is at stop, the lubricating liquid naturally lies in the suction pipe, by the effect of Terrestrial gravity. Thus, there is no problem in priming the pump on start-up.

However, in other configurations of turbomachines, it is not possible to use a support arm (also called bifurcation) located at 6 O'clock for the passage of the suction pipe, in particular if the turbomachine does not comprise such a bifurcation. This is the case for example of a turbomachine whose nacelle comprises a thrust reverser of the so-called "O-Duct" technology which, by its mere design, does not comprise a bifurcation at 6 O'clock. The suction pipe connecting the pump to the tank then should pass throughout the support arm located at 12 O'clock.

As a result, at stop, the suction pipe is emptied off the lubricating liquid by the action of Terrestrial gravity, into the tank and/or into the pump.

During a restart of the turbomachine, the pump should provide a considerable suction effort to reprime the suction pipe because of the height to be covered by the liquid. For example, the level difference between the tank and the topmost point of the suction pipe is in the range of 2 m.

In general, the pump is not sized to provide this suction effort, since in the other operating phases of the turbomachine, the pump provides a lower effort.

The invention aims to provide an aircraft turbomachine including means for repriming the suction pipe during a start-up phase of the turbomachine, to allow lubricating the components of the turbomachine quickly.

DISCLOSURE OF THE INVENTION

The invention provides an aircraft turbomachine including a lubricating circuit comprising in particular a lubricating liquid tank, a pump drawing lubricating liquid from the tank to inject it onto several components of the turbomachine and a suction pipe connecting the tank to a suction orifice of the pump, the turbomachine further including a start-up pneumatic circuit including a start-up tube in which a compressed air flow circulates intended to supply a pneumatic starter of the turbomachine, characterised in that it includes a pneumatic pipe extending from the start-up tube up to the tank to supply the tank with compressed air, in order to make the lubricating liquid circulate throughout the suction pipe in the direction of the pump upon start-up of the turbomachine.

The compressed air circuit is a pressurised air source that is available very quickly. Thus, during the start-up phase, this pressurised air source is used to pressurise the tank, allows repriming the suction pipe quickly, thus, it allows feeding the pump in quickly.

Preferably, the turbomachine includes a start-up valve disposed on the start-up tube and including a tapping at which the pneumatic pipe is connected to the start-up tube, the tapping being located on the start-up tube upstream of the start-up valve.

Preferably, the turbomachine includes an additional valve disposed on the pneumatic pipe.

Preferably, the turbomachine includes a start-up valve disposed on the start-up tube and a tapping at which the pneumatic pipe is connected to the start-up tube, the tapping being located on the start-up tube downstream of the start-up valve.

Preferably, the turbomachine includes a pressure limiter located in the pneumatic pipe, in order to limit the air pressure in the tank on start-up.

Preferably, the turbomachine includes a central compartment coaxial with a main axis A of the turbomachine, a fan compartment extending around and at a distance from the central compartment and coaxially with the main axis A and structural arms, extending radially with respect to the main axis A and vertically according to the direction of Terrestrial gravity, the structural arms being distributed vertically on either side of the central compartment and mechanically linking the central compartment to the fan compartment, wherein the suction pipe extends throughout a structural arm located vertically above the central compartment.

Preferably, the pump is mounted on the central compartment and the tank is mounted on the fan compartment.

The invention also relates to a method for starting up a turbomachine according to the invention, including a lubricating liquid pump, a lubricating liquid tank connected to the pump through a suction pipe and including a pneumatic starter supplied with compressed air through a start-up pipe, characterised in that it includes a phase of supplying the pneumatic starter with compressed air and a phase of supplying the tank with a portion of the compressed air in the start-up tube to make lubricating liquid circulate in the suction pipe from the tank up to the pump.

Preferably, the start-up tube includes a start-up valve which is open during the phase of supplying the pneumatic starter, and the phase of supplying the tank is implemented upon opening of the start-up valve.

Preferably, the tank sis supplied with compressed air through a pneumatic pipe including a valve and connected to the start-up tube, and the phase of supplying the tank is implemented upon opening of the valve.

DETAILED DESCRIPTION OF THE INVENTION

Figure 1:
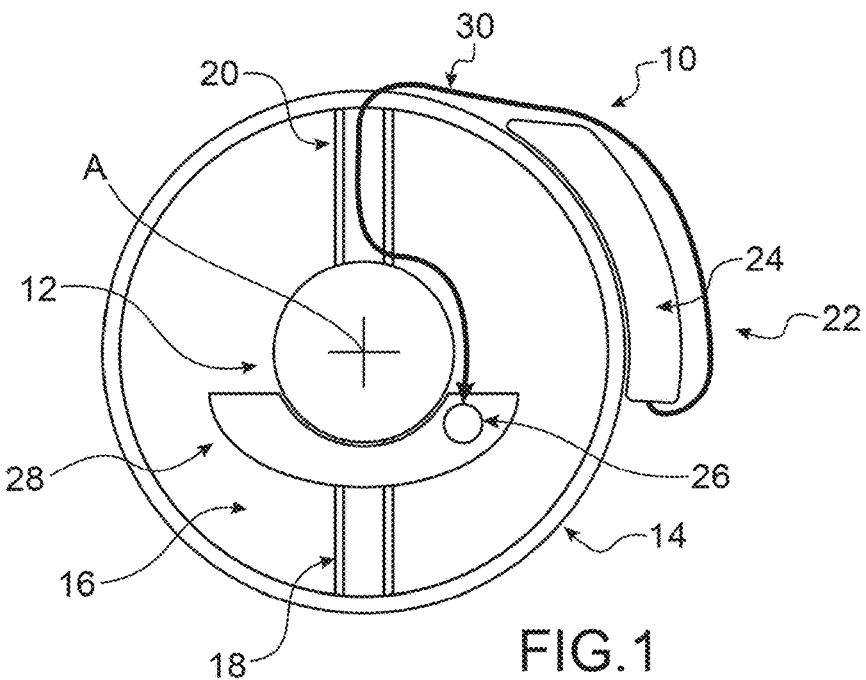
FIG. 1 is a schematic representation in a view according to an axial direction of an aircraft turbomachine including a suction pipe crossing the support arm disposed at 12 O'clock

In FIG. 1, an aircraft turbomachine 10 is represented including a main axis A, a central compartment 12 coaxial with the main axis A, commonly called "core compartment" and in which the different compressor stages, the combustion chamber and the turbines are arranged, and a fan compartment 14 coaxial with the main axis A and with the central compartment 12 and extending around and at a distance from the central compartment 12.

An annular space 16 is present between the central compartment 12 and the fan compartment 14 and enables the circulation of air in the turbomachine 10.

The link between the central compartment 12 and the fan compartment 14 is done in particular by structural arms 18, 20 which extend according to a radial direction with respect to the main axis A. The structural arms 18, 20 are provided with a profiled fairing in order to limit the aerodynamic drag and thus disturb the air flow throughout the annular space 16 as low as possible.

Furthermore, the structural arms 18, 20 include hollow portions to enable the passage of non-structural components, such as pipes, throughout the annular space 16, without interacting with the air flow flowing throughout the annular space 16.

The two structural arms 18, 20 also extend according to the vertical direction, when the turbomachine 10 is mounted on an aircraft on a horizontal ground and they are distributed vertically on either side of the central compartment 12.

A first structural arm 18 is located vertically below the central compartment 12, at the commonly so-called "6 O'clock" position, by analogy with a watch dial. The second structural arm 20 is located vertically above the central compartment 12, at the commonly so-called "12 O'clock" position.

The turbomachine 10 also includes a lubricating circuit 22 intended to supply lubricating liquid to a plurality of components (not represented) of the turbomachine 10, such as rotational guide bearings of a shaft. In particular, this lubricating circuit 22 includes a lubricating liquid tank 24 which is carried by the fan compartment 14 and a pump 26 which is mounted at the central compartment 12.

More particularly, the pump 26 is mounted in an accessory drive box 28 which is coupled to a shaft of the turbomachine and which includes a plurality of gears allowing providing different gear ratios for equipment of the turbomachine 10 rotatably driven by the accessory drive box 28, including the pump 26.

The lubricating circuit 22 also includes a suction pipe 30 which connects a suction orifice of the pump 26 to the tank 24 and through which the pump 26 draws the lubricating liquid contained in the tank 24.

Since the tank 24 is mounted on the fan compartment 14 and the pump 26 is mounted on the central compartment 12, the suction pipe 30 crosses the annular space 16.

Thus, the suction pipe 30 is mounted throughout the second structural arm 20 which is located at the 12 O'clock position, i.e. above the central compartment 12.

As said before, when the turbomachine 10 is at stop, the pump 26 does not suck in lubricating liquid from the tank 24. Since the suction pipe passes throughout the second structural arm 20, it includes a top point at the upper end of the second structural arm 20. By the action of Terrestrial gravity, the lubricating liquid contained in the suction pipe 30 is then emptied in the tank 24.

Figure 2:
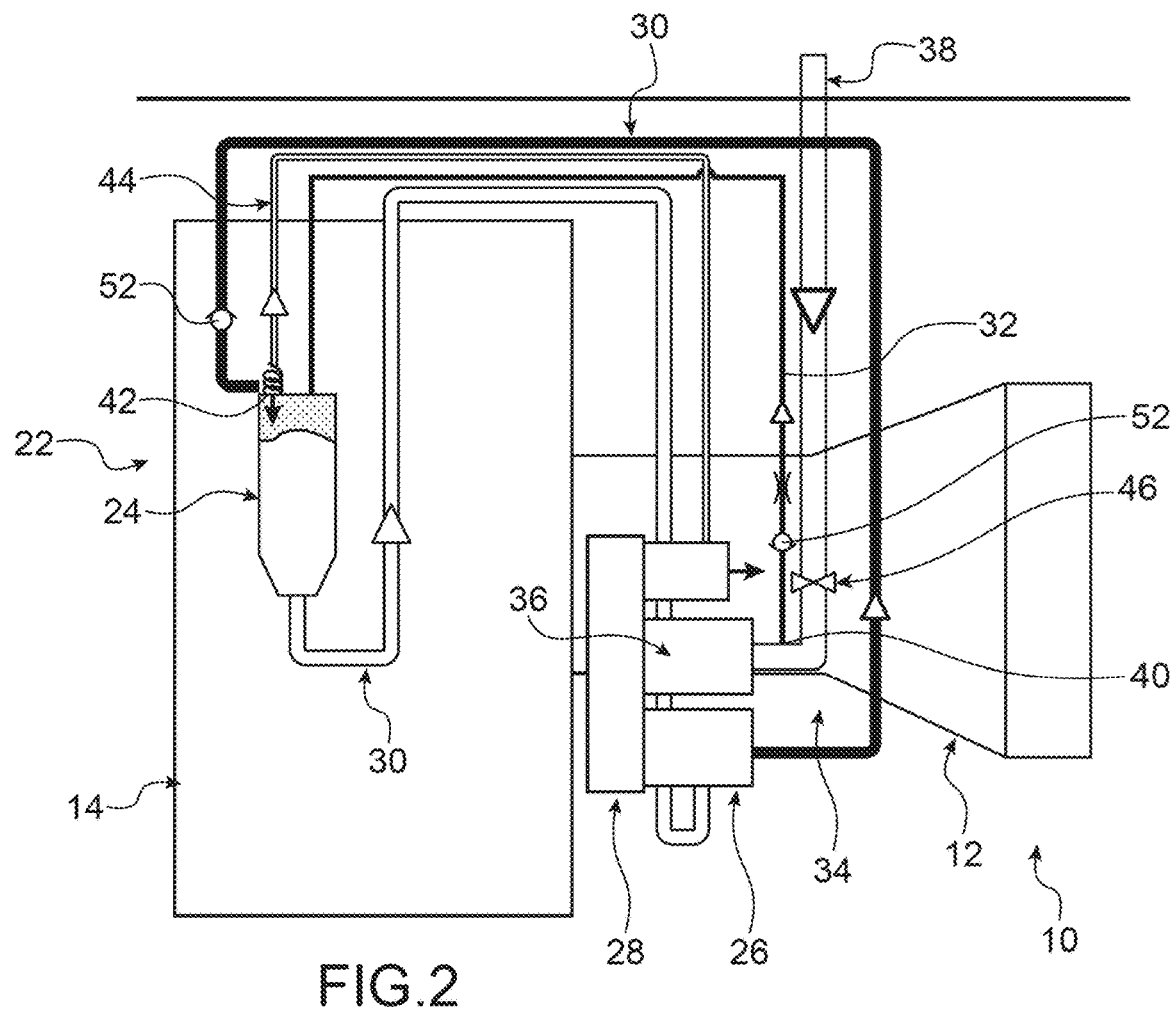
FIG. 2 is a schematic representation of a portion of the turbomachine including the lubricating circuit combined with a compressed air circuit for the implementation of the invention
Figure 3:
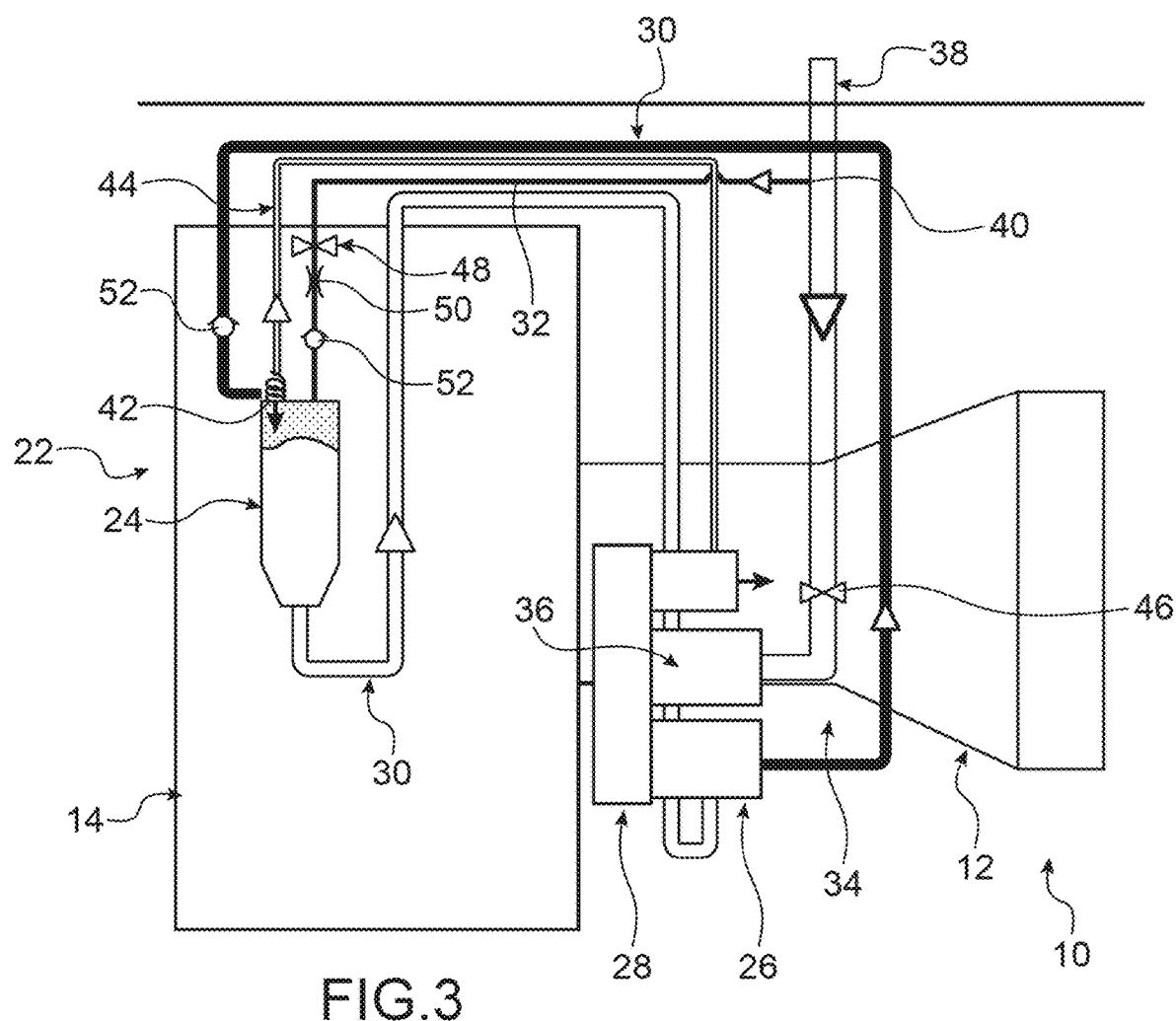
FIG. 3 is a schematic representation of a variant of the portion of the turbomachine represented in FIG. 2.

To reprime the suction pipe 30 during a start-up phase of the turbomachine, in order to quickly feed in the pump 26, and as shown in FIGS. 2 and 3, the turbomachine 10 includes a pneumatic pipe 32 which supplies the tank 24 with compressed air during the start-up phase.

The compressed air forces the lubricating liquid contained in the tank 24 to circulate in the suction pipe 30, crossing the top point of the suction pipe 30, until reaching the pump 26. Once the suction pipe 30 is filled with lubricating liquid, the pump 26 can then suck in alone the liquid contained in the tank 24.

This repriming of the suction pipe 30 is necessary only during a start-up phase of the turbomachine 10 because, at that time, the tank 24 is still not pressurised.

Next, when the turbomachine is operating, the tank 24 is continuously pressurised, for example and in particular by air drawn from a high-pressure (HP) compressor stage of the turbomachine.

At the time of start-up of the turbomachine 10, the high-pressure compressor does not operate at a speed high enough allowing producing a pressure for pressurising the tank 24 that would allow crossing the lubricating liquid vertical column between the tank 24 and the top point of the suction pipe 30.

The compressed air supplying the tank 24 during the start-up phase is derived from a pneumatic start-up circuit 34 of the turbomachine 10 whose compressed air source (not represented) is outside the turbomachine 10. For example, this air source consists of a compressor of an Auxiliary Power Unit APU of the aircraft or by a compressor air tank. This external compressed air source allows supplying an air pressure that is high enough to pressurise the tank 24.

The start-up circuit 34 includes a pneumatic starter 36 which is mounted on an accessory drive box 28, and a start-up tube 38 connecting the compressed air source to the starter.

To pressurise the tank 24 with compressed air from the start-up circuit 34, the pneumatic pipe 32 is connected to the start-up tube 38 by a tapping 40 formed in the start-up tube 38.

The pressure of air in the start-up tube, even outside the start-up phase, is generally in the range of 3 to 4 bars, which is largely enough to overcome the vertical column.

A pressure-relief valve 42 is arranged in the tank 24 to regulate the inner pressure of the tank 24 via a venting circuit 44.

As a non-limiting example, for a vertical column value of 2.5 m, which could be considered as a reference, a pressure 0.25 bar is then necessary to overcome this column at −40° C.

According to the embodiment represented in FIG. 2, the tapping 40 is disposed downstream of a start-up valve 46, i.e. between the start-up valve 46 and the starter 36.

This disposition has the advantage of not pressuring the tank 24 outside a start-up phase.

According to the embodiment represented in FIG. 3, the tapping 40 is disposed upstream of the start-up valve 46. For the pressurisation of the tank 24 to occur only during the start-up phase, an additional valve 48 is disposed in the pneumatic pipe 32.

This disposition has the advantage of enabling the pressurisation of the tank 24 even outside the start-up phase, for example in the event of failure.

Regardless of the embodiment, the pressure in the start-up tube 38 may be excessively high and hinder the operation of the pump 26.

To this end, the pneumatic pipe 32 includes a restriction 50 allowing limiting the air pressure supplying the tank 24.

Also, check valve 52 are disposed in the suction pipe 30 and the pneumatic pipe 32 in order to avoid inadvertent circulations of air or lubricating liquid.

What is claimed is:

1. An aircraft turbomachine including:
   a central compartment coaxial with a main axis of the turbomachine;
   a fan compartment coaxially with the main axis, the fan compartment extending around and at a distance from the central compartment;
   structural arms extending radially with respect to the main axis and vertically according to the direction of terrestrial gravity, the structural arms being distributed vertically on either side of the central compartment and mechanically linking the central compartment to the fan compartment, wherein the structural arms include a structural arm located vertically above the central compartment;
   a lubricating circuit comprising a lubricating liquid tank, a pump drawing lubricating liquid from the lubricating liquid tank to inject the lubricating liquid onto several components of the turbomachine, and a suction pipe connecting the lubricating liquid tank to a suction orifice of the pump, wherein the suction pipe extends through the structural arm located vertically above the central compartment;
   a start-up pneumatic circuit including a start-up tube in which a compressed air flow circulates intended to supply a pneumatic starter of the turbomachine; and
   a pneumatic pipe extending from the start-up tube up to the lubricating liquid tank to supply the lubricating liquid tank with compressed air, in order to make the lubricating liquid circulate throughout the suction pipe in the direction of the pump upon start-up of the turbomachine.

2. The turbomachine according to claim 1, including a start-up valve disposed on the start-up tube and including a tapping at which the pneumatic pipe is connected to the start-up tube, the tapping being located on the start-up tube upstream of the start-up valve.

3. The turbomachine according to claim 2, including an additional valve disposed on the pneumatic pipe.

4. The turbomachine according to claim 1, including a start-up valve disposed on the start-up tube and including a tapping at which the pneumatic pipe is connected to the start-up tube, the tapping being located on the start-up tube downstream of the start-up valve.

5. The turbomachine according to claim 1, including a pressure limiter located in the pneumatic pipe, in order to limit the air pressure in the lubricating liquid tank on start-up.

6. The turbomachine according to claim 1, the pump being mounted on the central compartment and the lubricating liquid tank being mounted on the fan compartment.

7. A method for starting up a turbomachine according to claim 1, comprising:
   supplying the start-up pneumatic circuit with compressed air; and
   supplying the lubricating liquid tank with a portion of the compressed air in the start-up tube to make lubricating liquid circulate in the suction pipe from the lubricating liquid tank up to the pump.

8. The method according to claim 7, wherein the start-up tube includes a start-up valve which is open during the phase of supplying the start-up pneumatic circuit, and wherein the step of supplying the lubricating liquid tank is implemented upon opening of the start-up valve.

9. The method according to claim 7, wherein the lubricating liquid tank is supplied with compressed air through the pneumatic pipe which includes a valve and is connected to the start-up tube, and wherein the step of supplying the lubricating liquid tank is implemented upon opening of the valve.

* * * * *